Patented July 14, 1925.

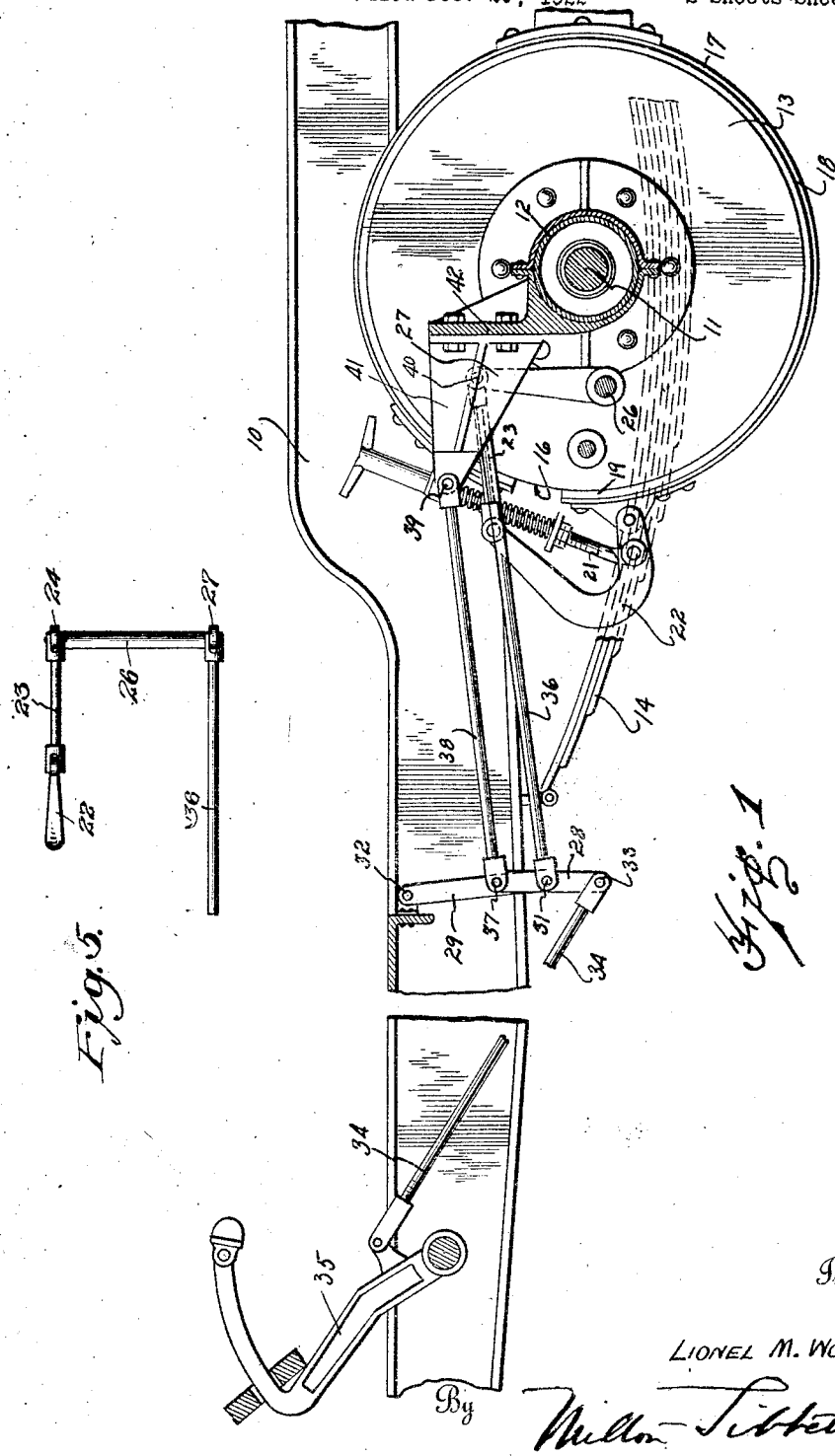

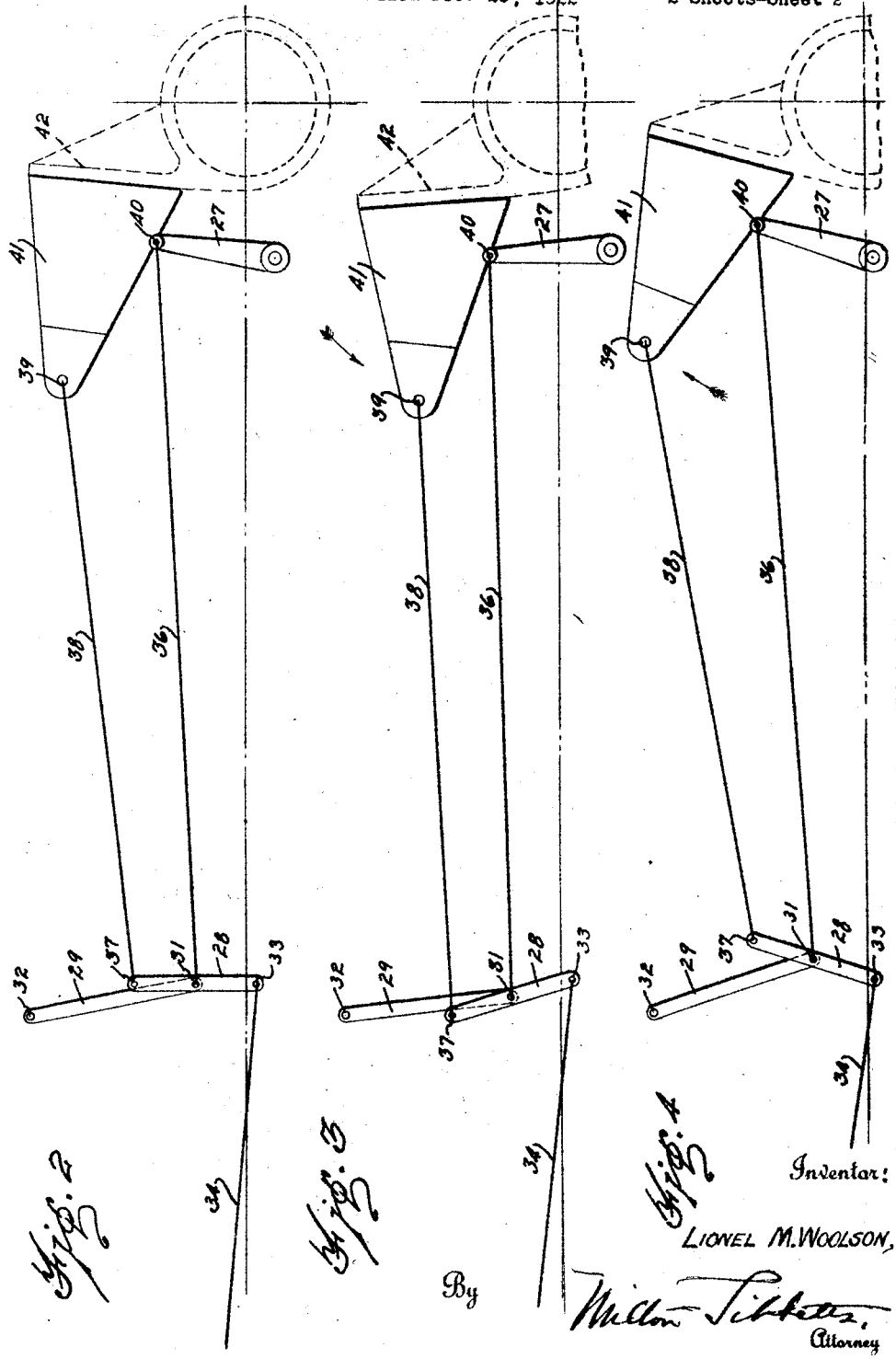

1,545,934

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed December 23, 1922. Serial No. 608,675.

*To all whom it may concern:*

Be it known that I, LIONEL M. WOOLSON, a citizen of the United States, and resident of Detroit, Wayne County, State of Michigan, have invented certain new and useful Improvements in Motor Vehicles, of which the following is a specification.

This invention relates to motor vehicles, especially to brake actuating apparatus therefor, and relates more particularly to brake actuating mechanism for use on a motor vehicle provided with the Hotchkiss type of drive, wherein the thrust and torque of the rear axle, set up by driving and braking of the vehicle, are taken thru the vehicle springs; the torque and radius rods usually employed in other types of drive being omitted.

In a moving vehicle of which the brakes are mounted on the driving axle housing, the application of the brakes develops a torque which tends to rotate the housing about the axle in the same direction as the rotation of the latter, and when this torque is taken by resilient members, as the vehicle springs, a small oscillatory movement of the housing is permitted, as is well known in the art to which this invention relates. Such movement interferes with the operation of the brake actuating mechanism, either causing the brakes to be tightened, or partially released, depending on the direction of movement of the vehicle.

It is the general object of this invention to provide a brake actuating mechanism in which compensation is effected for the oscillation of the axle housing under braking torque, so that a given brake setting may be maintained substantially constant regardless of the braking torque reaction.

Other objects and structural details will be apparent from the subjoined description, in connection with the accompanying drawing, in which—

Fig. 1 is a side elevation, partially in section, of a portion of a motor vehicle embodying this invention;

Fig. 2 is a diagrammatic representation of the mechanism of Fig. 1 in normal position with the vehicle at rest;

Figs. 3 and 4 are diagrammatic views, corresponding to Fig. 2, showing the mechanism when the brakes are applied with the vehicle moving forwardly and rearwardly, respectively, and Fig. 5 is a detail view in plan of a portion of the mechanism shown in Fig. 1.

Referring to Fig. 1, 10 indicates a frame member of a motor vehicle, and 11 the driving axle thereof. The axle 11 is mounted in the usual housing 12 to which is secured a brake supporting member 13. The frame member 10 is supported from the axle housing 12 thru the vehicle springs 14 in the usual manner, the springs 14 being adapted to transfer the driving axle thrust and torque from the axle housing 12 to the frame 10, in a manner well known in this art.

The ends of the axle 11 are fixed to the driving road wheels (not shown) of the usual type, provided with brake drum 16.

Surrounding the drum 16 is the brake band 17, lined with suitable brake facing 19. The ends of the band 17 are adapted to be drawn together by the adjustable link 21, thru the toggle lever 22. The upper end of toggle lever 22 is connected by a link 23 to the upper end of a lever 24, rigidly secured to rock shaft 26, which is suitably journaled on the housing 12. The other end of the shaft 26 is rigidly secured to the brake actuating lever 27, parallel to the lever 24.

Forwardly of the rear axle 11 of the vehicle is a floating lever 28, suspended from the frame member 10 by a link 29, pivotally attached to the floating lever 28 at a point 31 intermediate its ends, and pivotally attached to the frame member 10 at a point 32. The lower end of the floating lever 28 is connected, at 33, by a rod 34 to the usual pedal lever 35, thru which braking force is exerted by the vehicle operator. The intermediate point 31 of the floating lever 28 is connected to a pivot 40 at the upper end of the brake actuating lever 27, by a brake rod 36. The upper end of the floating lever 28 is connected by a pivot 37 to a strut member 38, which extends rearwardly, substantially parallel to the brake rod 36, and is pivotally attached at a point 39 to a bracket 41, rigidly secured to a lug 42 on the axle housing 12.

The various elements composing the above described mechanism are so proportioned and arranged, that the ratio of the distances from the pivot 31 to the pivots 33 and 37 is approximately equal to the ratio of the distances from the pivot 40 to the center of the axle 11 and to the point 39. The rod 36 and the strut 38 are also arranged so as to be substantially parallel. Such a proportioning of the various parts, provides for the brake mechanism substantially perfect compensation for the oscillatory movement of the housing 12, the compensation operation being as follows:

With the vehicle stationary, as shown in Fig. 2, a movement to the left of the rod 34 will draw the brake rod 36 forward, the pivot 31 moving in the arc of a circle struck from pivot 32, and pivot 37 being maintained as a nearly stationary fulcrum of the lever 28 by means of the strut 38. If, however, at the time of brake application, the vehicle is moving forwardly the housing 12 will tend to follow the counterclockwise rotation of the axle 11 as shown in Fig. 3, which tends to bring the point 40 nearer the point 31, releasing the brake. This tendency is compensated for by the strut 38, which also moves the pivot 37 to the left a proportionate amount, thus maintaining a constant tension in the brake rod 36. In a similar manner, if the brake application occurs while the vehicle is moving backwards, as shown in Fig. 4, the tendency of the torque reaction to separate the points 31 and 40, and thus tighten the brakes, is compensated for by the strut 38, which simultaneously moves point 37 a corresponding distance to the right.

It is apparent that this invention provides a brake actuating mechanism in which disturbance of the brake setting, caused by torque reaction in the axle, is compensated for in such a manner that any desired brake setting may be maintained substantially constant, regardless of the axle torque.

What is claimed, is:

1. The combination with a motor vehicle having a driving axle provided with a brake, and spring means transmitting the driving and brake torque of said axle to the vehicle, of mechanism adapted to actuate the brake, and means associated with the axle adapted to compensate said mechanism for changes in position of the axle caused by the braking torque thereon.

2. The combination with a motor vehicle having a driving axle, a housing therefor, a brake on the axle and a spring connecting the axle housing to the motor vehicle, of a brake actuating mechanism adapted to compensate for braking torque in the housing, comprising a brake actuating lever on the housing, a floating lever, a brake rod connecting the brake actuating lever to a point intermediate the ends of the floating lever, a strut connecting one end of the floating lever to the housing, and means for exerting a brake applying force to the other end of the floating lever.

3. The combination with a motor vehicle having a frame and an axle mounted in a housing connected to the frame by a spring, of a brake on the axle and brake actuating mechanism comprising a brake actuating lever on the housing, a floating lever, a link connecting an intermediate point of the floating lever to the frame, a strut connecting one end of the floating lever to the housing, a brake rod connecting said intermediate point of the floating lever to the brake actuating lever, and means for exerting a brake applying force to the other end of the floating lever.

4. The combination with a motor vehicle having a frame and an axle mounted in a housing connected to the frame by a spring, of a brake drum on the axle, a brake therefor, and brake actuating mechanism comprising a brake actuating lever on the housing, a floating lever, means connecting the floating lever to the brake actuating lever, and means connecting the floating lever to the housing whereby the position of the floating lever is varied in accordance with movements of the axle housing caused by brake torque.

5. The combination with a motor vehicle having a frame and an axle mounted in a housing connected to the frame by a spring, of a brake mounted on the housing and adapted to retard rotation of the axle, a floating lever, means operatively connecting the floating lever to the brake, and means connecting the floating lever to the housing so that movements of the latter under brake torque move the floating lever to compensate the brake for said movements of the housing.

6. The combination with a motor vehicle having a frame and an axle mounted in a housing connected to the frame by a spring, of a brake mounted on the housing and adapted to retard rotation of the axle, brake applying mechanism and means associated with the housing to compensate the brake applying mechanism for movements of the housing caused by brake torque.

7. The combination with a motor vehicle having an axle, a housing therefor and a frame resiliently connected with the housing, of a brake for the axle, and brake actuating mechanism including means operative upon movements of the housing to compensate the actuating mechanism for said movements.

8. The combination with a motor vehicle having a frame and an axle mounted in a housing connected to the frame by a spring, of a brake for the vehicle, brake actuating mechanism, and means including a strut member whereby said mechanism is compensated for movement of the housing caused by brake torque in either direction of vehicle travel.

9. The combination with a motor vehicle having a frame and an axle mounted in a housing connected to the frame by a spring, of a brake for the vehicle, a brake actuating mechanism including a floating lever, a lug on the housing and a strut member connecting the lug to the floating lever, whereby movements of the housing in either direction under brake torque effect compensatory movements in the brake actuating mechanism.

10. The combination with a motor vehicle having a frame and an axle mounted in a housing connected to the frame by a spring, of a brake for the vehicle, a brake actuating mechanism including a floating lever, a brake actuating lever, a pedal and means operatively connecting the pedal and the brake actuating lever to said floating lever, and a strut member connecting the floating lever to the housing so that movements of the housing under brake torque will effect a corresponding compensatory movement in the brake actuating mechanism.

11. The combination with a motor vehicle having a frame and an axle mounted in a housing connected to the frame by a spring, of a brake on the axle, and brake actuating mechanism including a suspended floating lever, a brake actuating lever, a rod connecting the brake actuating lever to the point of suspension of the floating lever, a strut member substantially parallel to said rod, connecting one end of the floating lever to the housing, and means to exert a brake applying force to the other end of the floating lever.

12. The combination with a motor vehicle having a frame and an axle mounted in a housing connected to the frame by a spring, of a brake for the axle, and brake actuating mechanism including a floating lever, a brake lever, a strut connecting one end of the floating lever to the housing, a rod substantially parallel to the strut connecting an intermediate point of the floating lever to the brake lever, and means to exert a braking stress on the other end of the floating lever, the ratio of the arms of the floating lever being substantially equal to the ratio of the distances from the brake lever to the housing end of the strut and to the center of the axle.

In testimony whereof I affix my signature.

LIONEL M. WOOLSON.